Patented Dec. 18, 1951

2,578,724

UNITED STATES PATENT OFFICE 2,578,724

PREPARATION OF HIGH MOLECULAR WEIGHT UNSATURATED ETHERS

Joseph K. Mertzweiller, Baton Rouge, La., assignor to Standard Oil Development Company, a corporation of Delaware No Drawing. Application November 24, 1948, Serial No. 61,913

8 Claims. (Cl. 260—614)

This invention relates to the preparation of high molecular weight alpha unsaturated aliphatic ethers by a hitherto unknown process.

Unsaturated ethers of the aliphatic series offer difficulties in preparations by conventional processes.

Of the synthetic methods commonly employed for preparing ethers, some cannot be used at all or have only limited application. The prior art shows that various acetals may be formed into unsaturated ethers by heating over catalysts of various kinds. This method is used widely for the lower molecular weight unsaturated ethers, but is not totally satisfactory for higher molecular weight compounds such as those in the range of $C_8$–$C_{30}$.

The isolation of the acetals, in many cases, is difficult and the handling and heating necessary for getting the unsaturated ethers by ordinary methods cause a loss in yield and produce mixtures of products containing impurities which must be separated later to get a chemically homogeneous product.

It is an object of the present invention to produce the unsaturated ethers having from about eight to thirty carbon atoms by a method which avoids these difficulties and gives good yields of the desired products.

The method of the present invention consists in heating alcohols and aldehydes together under conditions to produce directly as product the corresponding unsaturated ethers. Catalysts may be used if desired since they seem to promote the reactions but they are not absolutely necessary for obtaining satisfactory yields of the desired unsaturated ethers. Acid catalysts may be used if desired since they seem to promote the reactions, but they are not necessary for obtaining satisfactory yields of the desired unsaturated ethers if oxo aldehydes and alcohols are used as starting materials, for example.

The entire process to yield the unsaturated ethers is quite simple and economical in operation. The alcohol and aldehyde, which can have either the same or different carbon skeleton structures and are preferably of the more desirable branched chain carbon structures, are heated together under heating conditions such as might be employed for an esterification. Mixtures of aldehydes and alcohols such as might be obtained from synthetic methods as by the oxo reaction are conveniently employed. The temperature must be adjusted properly such that the unsaturated ether may be formed at a sufficiently great reaction rate as to make the operation of a practical nature. Unreacted starting materials and certain lower boiling by-products can be removed from the system by distillation, since normally the unsaturated ether will be the highest boiling material present in any substantial amount. This affords a convenient method for isolation of the product. Unreacted aldehyde and alcohol can be removed by volatilization from the reaction mixture and can, of course, be subjected to the reaction again to increase conversion to the unsaturated ether. The most practical procedure is to carry out at least the latter part of the distillation under reduced pressure to reduce product decomposition and tar formation. The quantity of water which is produced during the initial stages of the reaction period prior to distillation of the product can be used as a convenient indication of the extent of completion of the reaction. If it is desired to remove the unsaturated ether product from the reaction mixture by distillation, this should be done at reduced pressures to avoid decomposition.

It is not known just what kind of condensations occur in the reaction mixture or just what intermediates may be formed preceding the formation of the ether product. In fact, several mechanisms are very likely occurring simultaneously during the reaction.

It is not intended to in any way limit the process of the invention to any particular mechanism or mode of reaction.

The molar ratios of the reactants are not critical and various mixtures of aldehydes and alcohols may be conveniently employed. Any reasonable excess of either aldehyde or alcohol is readily recycled. A moderate excess of alcohol appears to favor the reaction. For instance, the aldehyde to alcohol mole ratio may be advantageously held at about 1:3.

Since water is a by-product, the reaction is facilitated by removal of water and gives increased unsaturated ether formation. This water removal may be conveniently handled by addition of an entrainer such as benzene, toluene, or the xylenes. The water is thus removed as one component of an azeotrope, the components of the azeotrope are separated, and the entrainer subsequently recycled.

The aldehydes and alcohols which may be converted to the unsaturated ethers by this improved technique include any of those of the aliphatic series. For best yields of the unsaturated ether, it has been discovered that the more highly branched aldehydes and alcohols are much to be preferred. For instance, the more highly branched aldehydes and alcohols from the oxo reaction give better yields of olefinic ether than do mixtures of 2-ethyl hexanal and 2-ethyl hexanol, while this mixture in turn gives better yields than a mixture of n-heptaldehyde and n-octanol. The reactants may be substituted by non-reactive substituents such as halogen atoms. These compounds, when subjected to the process, result in correspondingly substituted alpha unsaturated ethers. Use of unlike aldehyde and alcohol compounds will result in unsymmetrical ethers. Under these circumstances, mixtures or mixed ethers will be obtained.

The reactants employed need not be chemically pure components but can be operated with mixtures. The process is especially useful for use on synthetic mixtures such as can be produced by reacting various higher olefins with carbon monoxide and hydrogen, a reaction commonly known as the oxo reaction. Aldehydes and alcohols from other types of synthetic sources may also be used. The present process offers a very advantageous method for converting crude distilled fractions which contain both higher alcohols and aldehydes such as those having six to ten carbon atoms to highly useful and relatively easily isolatable product. This use of crude mixtures of reactants is, in fact, one of the oustanding advantages of this novel process. The process is also one of great simplicity both in the operational procedure and in the apparatus necessary.

The unsaturated ethers are identified in the usual way by determination of the bromine number, molecular weights and elemental analyses. Infrared analyses show the characteristic olefinic band as well as the ether band. The hydroxyl and carbonyl bands are substantially absent. Comparison of the elemental analysis with the calculated values gives an additional check on the structure of the compounds formed.

It is a further great advantage of this process, that, contrary to what might be expected from known processes for getting the ethers by way of reactions between aldehydes and alcohols, no intermediate products need be isolated. This results in an increase in yied of the desired product and offers a great many operational advantages. Thus a great deal of equipment and labor is eliminated in addition to a great time saving in starting with the original raw materials and obtaining the final product.

The alpha unsaturated ethers which can be obtained by this improved method of production have value as organic solvents, their olefinic bond and ether linkage giving them highly useful solvency properties. In addition, they find application as chemical intermediates in various fields of synthetic work because of their reactive olefin bond and ether grouping both of which are capable of a great many reactions. They are also valuable fuel additives.

They may also be reduced by hydrogenation to give the corresponding saturated ethers which also find a variety of uses.

The process will be described in more complete detail by the following examples:

EXAMPLE 1

A crude mixture of alcohols and aldehydes of the $C_8$ range, obtained by reacting $C_7$ olefins with carbon monoxide and hydrogen, was heated. In the first stages of the distillation, water was obtained as the condensate from the distillation. After the water stopped evolving from the reaction, the temperature was allowed to rise. A sharp fraction was obtained in about 40 volume percent yield which boiled at 285–292° F. at 10 mm. Hg pressure. This fraction was identified as predominantly consisting of the $C_{16}$ alpha unsaturated ether and showed the analytical values given in the table. The value of the bromine number of this product tends to indicate that some saturated ether may also be present.

EXAMPLE 2

A mixture of aldehydes and alcohols of the $C_8$ series, the mole ratio of aldehyde compounds to alcohols being approximately 1 to 3, was heated in a suitable apparatus for effecting continuous distillation of volatiles. An excess of benzene over the calculated amount to remove azeotropically the water produced was added to the reaction mixture. During the initial heating period, the water-benzene azeotrope was recovered by continuous distillation from the reacting mixture. About 0.87 mole of water was obtained per mole of aldehyde used. Excess alcohol also distilled from the mixture. The heating was continued and a liquid fraction boiling at 280–300° F. at 10 mm. Hg was recovered in over 50 weight percent yield based on aldehyde starting material. This fraction was identified as consisting essentially on the alpha unsaturated ether. The analytical data of this product are shown in the table.

EXAMPLE 3

A mixture of about 2 moles of 2-ethylhexaldehyde and 4 moles of 2-ethylhexanol and a small amount of sulfuric acid was heated at an average temperature of 235° F. About one hundred weight percent of benzene based on the amount of aldehyde present was added to the mixture as a water entrainer. During a period of about five hours, the water-benzene azeotrope was distilled from the system. About 0.8 mole of water was recovered per mole of aldehyde used. The temperature was then adjusted and unreacted aldehyde and alcohol distilled from the reaction mixture. As a fraction consisting essentially of the alpha unsaturated ether product there was obtained about 50% yield based on the aldehyde of a fraction boiling at 278–282° F. at 10 mm. Hg pressure. The analytical data obtained by study of this fraction are shown in the table.

Table

|  | Example 1 | Example 2 | Example 3 | Calculated for Unsaturated Ether $C_{16}H_{32}O$ |
|---|---|---|---|---|
| Bromine No. CG/G | 45 | 56 | 56 | 66 |
| Carbon, Per Cent | 79.4 | 79.4 | 80.0 | 80.0 |
| Hydrogen, Per Cent | 13.5 | 13.5 | 13.5 | 13.3 |
| Oxygen Per Cent (diff.) | 7.1 | 7.1 | 6.5 | 6.7 |
| Molecular Weight | 225 | 248 | --- | 240 |

I claim:

1. A process for the preparation of an alpha unsaturated aliphatic ether of relatively branched chain carbon structure, which comprises heating together a mixture consisting essentially of alkyl $C_8$ aldehydes and aliphatic alcohols, volatilizing the by-product water as formed, volatizing unconverted reactants and thereafter isolating the alpha unsaturated ether, a major portion of said unsaturated ether being of the $C_{16}$ series.

2. A process for the preparation of alpha unsaturated aliphatic ethers which comprises heating an aldehyde-alcohol mixture consisting essentially of $C_8$ compounds of the branched chain series and obtained in the oxo process, removing the water so formed and lower boiling constituents of the reaction mixture by volatilization, and thereafter isolating the unsaturated ether.

3. A process such as that described in claim 2 in which a substantial amount of benzene is added to the reaction mixture and the by-product water is removed as the benzene-water azeotrope.

4. A process for the preparation of alpha unsaturated aliphatic ethers having from 16 to 30 carbon atoms which comprises heating a liquid reaction mixture consisting essentially of an alkyl aldehyde and an alkyl alcohol, the aldehyde and alcohol each having at least 8 carbon atoms, volatilizing and removing by-product water as it is formed from the liquid mixture, and thereafter isolating the alpha unsaturated ether.

5. A process according to that described in claim 4 in which the aldehyde to alcohol mole ratio is approximately 1:3.

6. A process for the preparation of alpha unsaturated aliphatic ethers having from 16 to 30 carbon atoms which comprises heating a reaction mixture of alky aldehydes and alkyl alcohols, the aldehydes and alcohols each having at least 8 carbon atoms, and in which a relatively major portion of the reactants are of the branched chain class in the presence of a relatively small amount of a strong acid, volatilizing and removing by-product water as formed from the reaction mixture, and thereafter isolating the alpha unsaturated ether having a relatively branched chain carbon structure.

7. A process according to claim 6 in which the aldehyde and alcohol are of the $C_8$ series.

8. A process according to claim 6 in which a substantial amount of benzene is added to the reaction mixture and the by-product water is removed by volatilization of the benzene-water azeotrope.

JOSEPH K. MERTZWEILLER.

REFERENCES CITED

The following references are of record in the file of this patent:

UNITED STATES PATENTS

| Number | Name | Date |
|---|---|---|
| 1,902,169 | Herrman | Mar. 21, 1933 |
| 2,388,409 | Harvey | Nov. 6, 1945 |

OTHER REFERENCES

Sigmund et al.. "Monatschefte," vol. 51, pages 234–52 (1929).